US008883878B2

(12) United States Patent
Volkers et al.

(10) Patent No.: US 8,883,878 B2
(45) Date of Patent: Nov. 11, 2014

(54) THERMOPLASTIC POLYCARBONATE COMPOSITIONS

(75) Inventors: Andries Adriaan Volkers, Wouw (NL); Lydie Belot, Bergen op Zoom (NL)

(73) Assignee: Sabic Global Technologies B.V. (NL)

( * ) Notice: Subject to any disclaimer, the term of this patent is extended or adjusted under 35 U.S.C. 154(b) by 1091 days.

(21) Appl. No.: 11/427,356

(22) Filed: Jun. 29, 2006

(65) Prior Publication Data

US 2008/0004373 A1 Jan. 3, 2008

(51) Int. Cl.
*C08K 9/06* (2006.01)
(52) U.S. Cl.
CPC ...................................... *C08K 9/06* (2013.01)
USPC ........... 523/200; 523/209; 523/212; 524/451; 524/513
(58) Field of Classification Search
USPC ......................................... 523/200, 209, 212
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 4,154,775 A | 5/1979 | Axelrod | |
| 4,197,384 A | 4/1980 | Bialous et al. | |
| 4,221,728 A | 9/1980 | Jaquiss et al. | |
| 4,746,701 A | 5/1988 | Kress et al. | |
| 5,238,737 A | 8/1993 | Burkhardt et al. | |
| 5,608,027 A | 3/1997 | Crosby et al. | |
| 6,476,178 B1 * | 11/2002 | Mitsuta et al. | 528/196 |
| 6,956,073 B2 | 10/2005 | Takagi et al. | |
| 2003/0051635 A1 * | 3/2003 | Sankara Subramanian et al. | 106/437 |
| 2005/0085580 A1 | 4/2005 | Marugan et al. | |
| 2005/0261414 A1 | 11/2005 | Mitsuhashi et al. | |
| 2007/0282045 A1 * | 12/2007 | Volkers et al. | 524/261 |

FOREIGN PATENT DOCUMENTS

| | | | |
|---|---|---|---|
| EP | 0171826 B1 | | 2/1986 |
| EP | 1217040 | | 6/2002 |
| EP | 1452564 | | 9/2004 |
| JP | 02283760 A | * | 11/1990 |
| JP | 5098143 | | 4/1993 |
| JP | 07216181 A | * | 8/1995 |
| JP | 8059976 | | 3/1996 |
| JP | 2004143410 A | | 5/2004 |
| WO | WO 80/00708 A1 | | 4/1980 |
| WO | 0236686 | | 5/2002 |

OTHER PUBLICATIONS

Machine translation of JP 07-216181, Aug. 15, 1995.*
Full English-language translation of JP 02-283760 A, Nov. 21, 1990.*
Derwent abstract for JP 2003-096290 A, Derwent No. 2003-881233, Apr. 3, 2003.*
American Polymer Standards Corporation: A Question of Molecular Weight [online], retrieved on Oct. 29, 2009. Retrieved from the internet: <URL: http://www.ampolymer.com/QuestionMW.html, no date.*
"Mechanical Properties and Dispersion Behavior of Composite Materials Compounded with Surface Treated Titanium Dioxides", A. Hamamoto and T. Tanaka. Journal of Reinforced Plastics and Composites, vol. 21, No. 07/2002; pp. 603-615.
Kronos 2233 Titanium Dioxide Pigment Data Sheet; 2001; 1 pg.
Kronos 2450 Titanium Dioxide Data Sheet; 2001; 1 pg.
Kronos TiO2 Grades and Applications; Mar. 2009; 20 pgs.

* cited by examiner

*Primary Examiner* — Vickey Nerangis
(74) *Attorney, Agent, or Firm* — Cantor Colburn LLP

(57) ABSTRACT

A thermoplastic composition comprising from 30 to 89.5 wt. % of an aromatic polycarbonate, from 0.5 to 20 wt. % of an impact modifier, from 0 to 25 wt. % of an aromatic vinyl copolymer, from 6 to 35 wt. % of a mineral filler, and from 4 to 20 wt. % of a titanium dioxide, wherein the titanium dioxide is coated with silicone or siloxane, based on the total weight of the composition, has been found to exhibit improved mechanical properties and other characteristics and less degradation than filled thermoplastic compositions without the particular coated titanium dioxide. The composition optionally comprises an acid or acid salt. An article may be formed by molding, extruding, shaping or forming such a composition to form the article.

17 Claims, No Drawings

US 8,883,878 B2

THERMOPLASTIC POLYCARBONATE COMPOSITIONS

BACKGROUND OF THE INVENTION

This invention is directed to thermoplastic compositions comprising an aromatic polycarbonate, and in particular filled thermoplastic polycarbonate compositions having improved mechanical properties.

Polycarbonates are useful in the manufacture of articles and components for a wide range of applications, from automotive parts to electronic appliances. Because of their broad use, particularly in metal replacement applications, such as in automotive applications, there is a need for increased stiffness, reduced coefficient of thermal expansion while maintaining excellent ductility and flow.

One known method of increasing stiffness in polycarbonates is with the addition of mineral fillers, such as talc and mica. A problem with mineral filled polycarbonate compositions and blends of polycarbonate compositions is that mineral filled, specifically talc and/or mica filled, polycarbonate or polycarbonate blends degrade upon processing. As used herein, "degrade" and "degradation" of polycarbonates or polycarbonate blends are known to one skilled in the art and generally refer to a reduction in molecular weight and/or a change for the worse in mechanical or physical properties.

There remains a need to reduce or control the amount of degradation encountered with filled polymeric materials, and to provide filled materials with improved mechanical properties similar to unfilled polycarbonates and polycarbonate blends.

SUMMARY OF THE INVENTION

A thermoplastic composition comprises from 30 to 89.5 wt. % of an aromatic polycarbonate, from 0.5 to 20 wt. % of an impact modifier, from 0 to 25 wt. % of an aromatic vinyl copolymer, from 6 to 35 wt. % of a mineral filler, and from 4 to 20 wt. % of a titanium dioxide, wherein the titanium dioxide is coated with silicone or siloxane, based on the total weight of the composition. The composition optionally comprises an acid or acid salt. The thermoplastic composition of the invention has improved mechanical properties.

In an alternative embodiment, a thermoplastic composition comprises from 30 to 89.5 wt. % of an aromatic polycarbonate resin, from 0.5 to 20 wt. % of an impact modifier, from 0 to 25 wt. % of a vinyl aromatic copolymer, from 6 to 35 wt. % of talc, and from 4 to 20 wt. % of a titanium dioxide, wherein the titanium dioxide is coated with silicone or siloxane, based on the total weight of the composition.

An article may be formed by molding, extruding, shaping or forming such a composition to form the article.

In another embodiment, a thermoplastic composition consists of from 50 to 85 wt. % of an aromatic polycarbonate resin, from 1 to 20 wt. % of an impact modifier, from 2 to 25 wt. % of a vinyl aromatic copolymer, from 8 to 25 wt. % of talc, from 0.01 to 5 wt. % of an acid or acid salt, and from 4 to 20 wt. % of a titanium dioxide, wherein the titanium dioxide is coated with silicone or siloxane, and from 0.01 to 7 wt. % of additives, wherein the additives comprise a filler, an antidrip agent, a heat stabilizer, a light stabilizer, an antioxidant, a plasticizer, an antistat agent, a mold release agent, a UV absorber, a lubricant, a pigment, a dye, a colorant, or combinations of two or more of the foregoing based on the total weight of the composition.

The above-described and other features are exemplified by the following detailed description.

DETAILED DESCRIPTION OF THE INVENTION

A thermoplastic composition comprises from 30 to 89.5 wt. % of an aromatic polycarbonate, from 0.5 to 20 wt. % of an impact modifier, from 0 to 25 wt. % of an aromatic vinyl copolymer, from 6 to 35 wt. % of a mineral filler, and from 4 to 20 wt. % of a titanium dioxide, wherein the titanium dioxide is coated with silicone or siloxane, based on the total weight of the composition. The composition optionally comprises an acid or acid salt. In some embodiments the composition exhibits improved impact and ductility, as well as excellent molecular weight retention. As used herein, "excellent molecular weight retention" means that the molecular weight of the polycarbonate measured after some type of processing is similar or not significantly different from the molecular weight of the polycarbonate before the processing. In other words, the molecular weight degradation is such that it does not materially adversely affect the mechanical properties. In an embodiment, the molecular weight retention is at least 80%, optionally at least 85%, and in some embodiments at least 90%. In an embodiment, the molecular weight of the polycarbonate is at least 46,000 g/mol, optionally at least 48,000 g/mol, optionally at least 50,000 g/mol, based on polystyrene calibration standards. Processing includes, for example, compounding, molding, extruding, and other types of processing known to one skilled in the art.

In some embodiments, the acid or acid salt comprises phosphorous. The acid or acid salt, if present, may be present in an amount of from 0.01 to 5 wt. % or in a weight ratio of acid to filler of at least 0.0035:1.

In some embodiments, the impact modifier comprises ABS, MBS, Bulk ABS, AES, ASA, MABS, polycarbonate-polysiloxane copolymers, and combinations thereof. In some embodiments, the aromatic vinyl copolymer comprises SAN.

In an exemplary embodiment, the mineral filler is talc. Any suitable talc may be used. In some embodiments, a fine talc having a particle size distribution D50 of 3 microns or less is selected.

In an alternative embodiment, a thermoplastic composition comprises from 30 to 89.5 wt. % of an aromatic polycarbonate resin, from 0.5 to 20 wt. % of an impact modifier, from 0 to 25 wt. % of a vinyl aromatic copolymer, from 6 to 35 wt. % of talc, and from 4 to 20 wt. % of a titanium dioxide, wherein the titanium dioxide is coated with silicone or siloxane, based on the total weight of the composition.

In another embodiment, a thermoplastic composition consists of from 50 to 85 wt. % of an aromatic polycarbonate resin, from 1 to 20 wt. % of an impact modifier, from 2 to 25 wt. % of a vinyl aromatic copolymer, from 8 to 25 wt. % of talc, from 0.01 to 5 wt. % of an acid or acid salt, and from 4 to 20 wt. % of a titanium dioxide, wherein the titanium dioxide is coated with silicone or siloxane, and from 0.01 to 7 wt. % of additives, wherein the additives comprise a filler, an antidrip agent, a heat stabilizer, a light stabilizer, an antioxidant, a plasticizer, an antistat agent, a mold release agent, a UV absorber, a lubricant, a pigment, a dye, a colorant, or combinations of two or more of the foregoing based on the total weight of the composition.

An article may be formed from any of the above thermoplastic compositions.

It is known in the art to add acids or acid salts in very small quantities to polycarbonates and polycarbonate blends for the purpose of quenching, inactivating or deactivating undesirable components and for stabilizing the polycarbonate or polycarbonate blends. The addition of the acid often deactivates trans-esterification catalysts, polycarbonate synthesis or condensation catalysts. It is also known to use a composition comprising a combination of a phosphorous containing acid and an ester of a phosphorous containing acid to deactivate or inactivate undesirable ingredients. See, for example, U.S. Pat. No. 5,608,027 to Crosby et al., incorporated herein by reference. The acids, acid salts and esters of acids are used in very small levels to quench or inactivate, but when used in greater levels it is known that there is polycarbonate degradation.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present; and "direct bond", where part of a structural variable specification, refers to the direct joining of the substituents preceding and succeeding the variable taken as a "direct bond".

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The modifier "about" used in connection with a quantity is inclusive of the stated value and has the meaning dictated by the context (e.g., includes the degree of error associated with measurement of the particular quantity).

As used herein, the terms "polycarbonate" and "polycarbonate resin" mean compositions having repeating structural carbonate units of the formula (1):

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

wherein $Y^1$, $A^1$ and $A^2$ are as described above. Also included are bisphenol compounds of general formula (4):

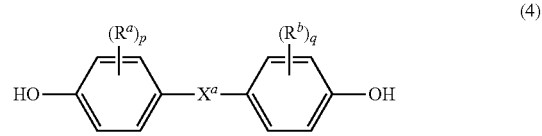

wherein $R^a$ and $R^b$ each represent a halogen atom or a monovalent hydrocarbon group and may be the same or different; p and q are each independently integers of 0 to 4; and $X^a$ represents one of the groups of formula (5):

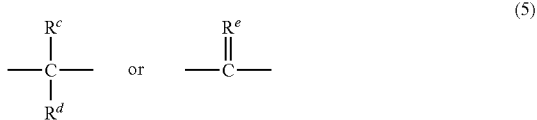

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl) phthalimidine, 2-phenyl-3,3-bis-(4-hydroxyphenyl) phthalimidine (PPPBP), and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of about 0.05 wt. % to about 2.0 wt. %. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (6)

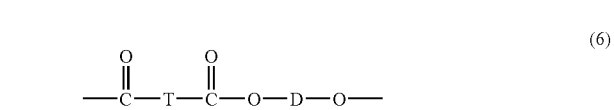

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

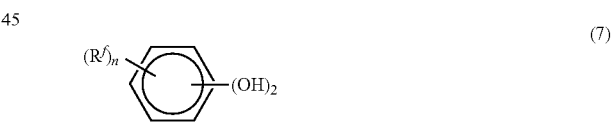

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In one specific embodiment, the polycarbonate is a linear homopolymer derived from bisphenol A, in which each of $A^1$ and $A^2$ is p-phenylene and $Y^1$ is isopropylidene.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-188}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate resins may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

In addition to the polycarbonates described above, it is also possible to use combinations of the polycarbonate with other thermoplastic polymers, for example combinations of polycarbonates and/or polycarbonate copolymers with polyesters. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

In one embodiment, poly(alkylene terephthalates) are used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Blends and/or mixtures of more than one polycarbonate may also be used. For example, a high flow and a low flow polycarbonate may be blended together.

The thermoplastic further includes one or more impact modifier compositions to increase the impact resistance of the thermoplastic composition. These impact modifiers may include an elastomer-modified graft copolymer comprising (i) an elastomeric (i.e., rubbery) polymer substrate having a Tg less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (8):

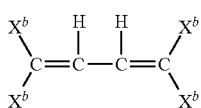

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9):

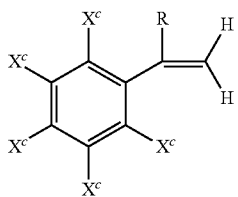

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10):

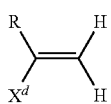

wherein R is hydrogen, $C_1$-$C_5$ alkyl, bromo, or chloro, and $X^d$ is cyano, $C_1$-$C_{12}$ alkoxycarbonyl, $C_1$-$C_{12}$ aryloxycarbonyl, hydroxy carbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (8), (9), or (10). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 wt. % to about 95 wt. % of the total graft copolymer, more specifically about 20 wt. % to about 90 wt. %, and even more specifically about 40 wt. % to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (10). In one embodiment, R is hydrogen or $C_1$-$C_2$ alkyl, and $X^d$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 wt. % to about 95 wt. % elastomer-modified graft copolymer and about 5 wt. % to about 65 wt. % graft (co)polymer, based on the total weight of the impact modifier. In another embodiment, such impact modifiers comprise about 50 wt. % to about 85 wt. %, more specifically about 75 wt. % to about 85 wt. % rubber-modified graft copolymer, together with about 15 wt. % to about 50 wt. %, more specifically about 15 wt. % to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^9$ is hydrogen or a $C_1$-$C_8$ linear or branched hydrocarbyl group and $R^h$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methaacryloxypropyl)methyldimethoxysilane, to afford silicone rubber having an average particle size from about 100 nanometers to about 2 micrometers. At least one branched acrylate rubber monomer is then polymerized with the silicone rubber particles, optionally in the presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers may be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt. %, optionally greater than or equal to about 60 wt. % by weight of the graft polymer. The rubber is preferably present in an amount less than or equal to about 95 wt. %, optionally less than or equal to about 90 wt. % of the graft polymer.

The rubber forms the backbone of the graft polymer, and is preferably a polymer of a conjugated diene having the formula (11):

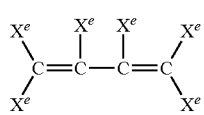
(11)

wherein $X^e$ is hydrogen, $C_1$-$C_5$ alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like. Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One preferred type of grafting monomer is a monovinylaromatic hydrocarbon having the formula (12):

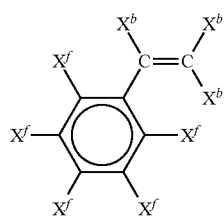
(12)

wherein $X^b$ is as defined above and $X^f$ is hydrogen, $C_1$-$C_{10}$ alkyl, $C_1$-$C_{10}$ cycloalkyl, $C_1$-$C_{10}$ alkoxy, $C_6$-$C_{18}$ alkyl, $C_6$-$C_{18}$ aralkyl, $C_6$-$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromo styrene, tetra-chlorostyrene, mixtures comprising at least one of the foregoing compounds, and the like.

A second type of grafting monomer that may be polymerized in the presence of the polymer backbone are acrylic monomers of formula (13):

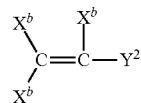
(13)

wherein $X^b$ is as previously defined and $Y^2$ is cyano, $C_1$-$C_{12}$ alkoxycarbonyl, or the like. Examples of such acrylic monomers include acrylonitrile, ethacrylonitrile, methacrylonitrile, alpha-chloroacrylonitrile, beta-chloro acrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like.

A mixture of grafting monomers may also be used, to provide a graft copolymer. Preferred mixtures comprise a monovinylaromatic hydrocarbon and an acrylic monomer. Preferred graft copolymers include acrylonitrile-butadiene-styrene (ABS) and methacrylonitrile-butadiene-styrene (MBS) resins. Suitable high-rubber acrylonitrile-butadiene-styrene resins are available from General Electric Company as BLENDEX® grades 131, 336, 338, 360, and 415.

The composition also may include an aromatic vinyl copolymer, for example, a styrenic copolymer (also referred to as a "polystyrene copolymer"). The terms "aromatic vinyl copolymer" and "polystyrene copolymer" and "styrenic copolymer", as used herein, include polymers prepared by methods known in the art including bulk, suspension, and emulsion polymerization employing at least one monovinyl aromatic hydrocarbon. The polystyrene copolymers may be random, block, or graft copolymers. Examples of monovinyl aromatic hydrocarbons include alkyl-, cycloalkyl-, aryl-, alkylaryl-, aralkyl-, alkoxy-, aryloxy-, and other substituted vinylaromatic compounds, as combinations thereof. Specific examples include: styrene, 4-methylstyrene, 3,5-diethylstyrene, 4-n-propylstyrene, α-methylstyrene, α-methylvinyltoluene, α-chlorostyrene, α-bromostyrene, dichlorostyrene, dibromostyrene, tetrachlorostyrene, and the like, and combinations thereof. The preferred monovinyl aromatic hydrocarbons used are styrene and α-methylstyrene.

The composition also comprises an aromatic vinyl copolymer. The aromatic vinyl copolymer contains a comonomer, such as vinyl monomers, acrylic monomers, maleic anhydride and derivates, and the like, and combinations thereof. As defined herein, vinyl monomers are aliphatic compounds having at least one polymerizable carbon-carbon double bond. When two or more carbon-carbon double bonds are present, they may be conjugated to each other, or not. Suitable vinyl monomers include, for example, ethylene, propylene, butenes (including 1-butene, 2-butene, and isobutene), pentenes, hexenes, and the like; 1,3-butadiene, 2-methyl-1,3-butadiene (isoprene), 1,4-pentadiene, 1,5-hexadiene, and the like; and combinations thereof.

Acrylic monomers include, for example, acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate, and the like, and mixtures thereof.

Maleic anhydride and derivatives thereof include, for example, maleic anhydride, maleimide, N-alkyl maleimide, N-aryl maleimide or the alkyl- or halo-substituted N-arylmaleimides, and the like, and combinations thereof.

The amount of comonomer(s) present in the aromatic vinyl copolymer can vary. However, the level is generally present at a mole percentage of about 2% to about 75%. Within this range, the mole percentage of comonomer may specifically be at least 4%, more specifically at least 6%. Also within this range, the mole percentage of comonomer may specifically be up to about 50%, more specifically up to about 25%, even more specifically up to about 15%. Specific polystyrene copolymer resins include poly(styrene maleic anhydride), commonly referred to as "SMA" and poly(styrene acrylonitrile), commonly referred to as "SAN".

In one embodiment, the aromatic vinyl copolymer comprises (a) an aromatic vinyl monomer component and (b) a cyanide vinyl monomer component. Examples of (a) the aromatic vinyl monomer component include α-methylstyrene, o-, m-, or p-methylstyrene, vinyl xylene, monochloro styrene, dichlorostyrene, monobromostyrene, dibromostyrene, fluorostyrene, p-tert-butylstyrene, ethylstyrene, and vinyl naphthalene, and these substances may be used individually or in combinations. Examples of (b) the cyanide vinyl monomer component include acrylonitrile and methacrylonitrile, and these may be used individually or in combinations of two or more. There are no particular restrictions on the composition ratio of (a) to (b) in the aromatic vinyl copolymer thereof, and this ratio should be selected according to the application in question. Optionally, the aromatic vinyl copolymer can contain about 95 wt. % to about 50 wt. % (a), optionally about 92 wt. % to about 65 wt. % (a) by weight of (a)+(b) in the aromatic vinyl copolymer and, correspondingly, about 5 wt. % to about 50 wt. % (b), optionally about 8 wt. % to about 35 wt. % (b) by weight of (a)+(b) in the aromatic vinyl copolymer.

The weight average molecular weight (Mw) of the aromatic vinyl copolymer can be 30,000 to 200,000, optionally 30,000 to 110,000, measured by gel permeation chromatography.

Methods for manufacturing the aromatic vinyl copolymer include bulk polymerization, solution polymerization, suspension polymerization, bulk suspension polymerization and emulsion polymerization. Moreover, the individually copolymerized resins may also be blended. The alkali metal content of the aromatic vinyl copolymer can be about 1 ppm or less, optionally about 0.5 ppm or less, for example, about 0.1 ppm or less, by weight of the aromatic vinyl copolymer. Moreover, among alkali metals, the content of sodium and potassium in component (b) can be about 1 ppm or less, and optionally about 0.5 ppm or less, for example, about 0.1 ppm or less.

In one embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer may have a molecular weight of 50,000 to about 200,000 on a polystyrene standard molecular weight scale and may comprise various proportions of styrene to acrylonitrile. For example, free SAN may comprise about 75 wt. % styrene and about 25 wt. % acrylonitrile based on the total weight of the free SAN copolymer. Free SAN may optionally be present by virtue of the addition of a grafted rubber impact modifier in the composition that contains free SAN, and/or free SAN may by present independent of the impact modifier in the composition.

The composition may comprise about 2 wt. % to about 25 wt. % free SAN, optionally about 2 wt. % to about 20 wt. % free SAN, for example, about 5 wt. % to about 15 wt. % free SAN or, optionally, about 7.5 wt. % to about 10 wt. % free SAN, by weight of the composition as shown in the examples herein.

The composition also includes at least one mineral filler. A non-exhaustive list of examples of mineral fillers suitable for use in the composition include, but are not limited to, talc, mica, wollastonite, clay and the like. Combinations of fillers may also be used. As used herein, the term "mineral filler" includes any synthetic and naturally occurring reinforcing agents for polycarbonates and polycarbonate blends that can be combined with an acid or acid salt for a synergistic effect that produces balanced physical properties and does not degrade the polycarbonate or polycarbonate blend.

In one embodiment, the mineral filler is talc. Any suitable talc may be used. In some embodiments, the talc is a fine talc having a particle size distribution D50 of less than 10 micron, optionally less than 5 micron or less than 3 micron. Talcs are commercially available and are known in the art. One example of a suitable talc is talc having the tradename Jetfine 3CA, which has a particle size distribution D50 of about 1.1 micron, available from Luzenac.

The composition further comprises a titanium dioxide ($TiO_2$). The $TiO_2$ is a coated $TiO_2$ having a particular type of coating comprising silica or siloxane. As used herein, "coated" means that the titanium dioxide has at least a silicone or siloxane containing coating or surface treatment, such as an organic siloxane. The surface coating or treatment may be organic or inorganic or both. Other coatings or treatments, such as alumina, may also be present. As used herein, "uncoated" means that the titanium dioxide is not coated with silicone or siloxane, although other coatings or surface treatments, such as alumina, may be present. Titanium dioxides are commercially available from many suppliers, such as E.I. du Pont de Nemours, Inc., Kronos Worldwide International, Inc. and Millennium Chemicals, and in many different grades. Examples of commercially available titanium dioxides suitable for use include, but are not limited to, Kronos® 2233, Kronos®2450 (both available from Kronos Worldwide, Inc.) and Tiona® RL-91 (Millennium Chemicals).

The composition also optionally comprises an organo-hydrosiloxane. The organo-hydrosiloxane has the formula:

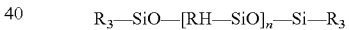

wherein each R is individually a hydrogen, $C_1$ to $C_8$ alkyl or $C_6$ to $C_{12}$ aryl, and n is from 1 to about 50. In one embodiment, each R is methyl, and n is about 15 to 25, optionally about 20. An example of a commercially available organo-hydrosiloxane includes DF1040 available from GE Bayer Silicones.

The organo-hydrosiloxane may also be a copolymer comprising an organo-hydrosiloxane and a polysiloxane. In some embodiments, the copolymer comprising an organo-hydrosiloxane and a polysiloxane comprises at least 10 wt. % of the organo-hydrosiloxane, optionally at least 50 wt. % of the organo-hydrosiloxane.

The polysiloxane in the copolymer may be a polyalkylsiloxane, a polyarylsiloxane, a polyorganosiloxane, and the like. The polysiloxane has the formula:

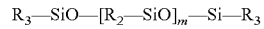

wherein each R is individually a hydrogen, $C_1$ to $C_8$ alkyl or $C_6$ to $C_{12}$ aryl, and m is from 1 to about 200. In one embodiment, the polysiloxane is a polydimethylsiloxane (PDMS) wherein each R is methyl. Examples of commercially available polydimethylsiloxanes include SF96-1000 and SF18-350 available from GE Bayer Silicones.

If a copolymer comprising an organo-hydrosiloxane and a polysiloxane is used, the copolymer may be a copolymer comprising, for example, a poly methyl hydrogen siloxane (PMHS) and a polydimethylsiloxane (PDMS).

The composition optionally further comprises an acid or an acid salt. In one embodiment, the acid or acid salt is an inorganic acid or inorganic acid salt. In one embodiment, the acid is an acid comprising a phosphorous containing oxy-acid.

In one embodiment, the phosphorous containing oxy-acid is a multi-protic phosphorus containing oxy-acid having the general formula (14):

$$H_m P_t O_n \quad (14)$$

where m and n are each 2 or greater and t is 1 or greater.

Examples of the acids of formula (14) include, but are not limited to, acids represented by the following formulas: $H_3PO_4$, $H_3PO_3$, and $H_3PO_2$. In some embodiments, the acid will include one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, mono natrium phosphate, and the like, may be used. The acid or acid salt is preferably selected so that it can be effectively combined with the mineral filler, or the mineral filler and the organo-hydrosiloxane, to produce a synergistic effect and a balance of properties, such as flow and impact, in the polycarbonate or polycarbonate blend.

The thermoplastic composition may include various additives ordinarily incorporated in resin compositions or blends of this type, with the proviso that the additives are preferably selected so as to not significantly adversely affect the desired properties of the thermoplastic composition. Mixtures of additives may be used. Such additives may be mixed at a suitable time during the mixing of the components for forming the composition.

Other fillers and/or reinforcing agents may be used if desired, as long as they do not further degrade the composition. Suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers, in addition to the mineral filler, are generally used in amounts of about zero to about 50 parts by weight, optionally about 1 to about 20 parts by weight, and in some embodiments, about 4 to about 15 parts by weight, based on 100 parts by weight of the total composition.

The composition may optionally comprise other polycarbonate blends and copolymers, such as polycarbonate-polysiloxane copolymers, esters and the like.

The thermoplastic composition may optionally comprise a cycloaliphatic polyester resin. The cycloaliphatic polyester resin comprises a polyester having repeating units of the formula (15):

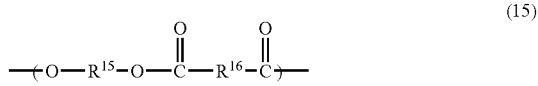

where at least one $R^{15}$ or $R^{16}$ is a cycloalkyl containing radical.

The polyester is a condensation product where $R^{15}$ is the residue of an aryl, alkane or cycloalkane containing diol having 6 to 20 carbon atoms or chemical equivalent thereof, and $R^{16}$ is the decarboxylated residue derived from an aryl, aliphatic or cycloalkane containing diacid of 6 to 20 carbon atoms or chemical equivalent thereof with the proviso that at least one $R^{15}$ or $R^{16}$ is cycloaliphatic. In some embodiments, both $R^{15}$ and $R^{16}$ are cycloaliphatic.

Cycloaliphatic polyesters are condensation products of aliphatic diacids, or chemical equivalents and aliphatic diols, or chemical equivalents. Cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols.

The polyester resins are typically obtained through the condensation or ester interchange polymerization of the diol or diol equivalent component with the diacid or diacid chemical equivalent component.

$R^{15}$ and $R^{16}$ are preferably cycloalkyl radicals independently selected from the following formula:

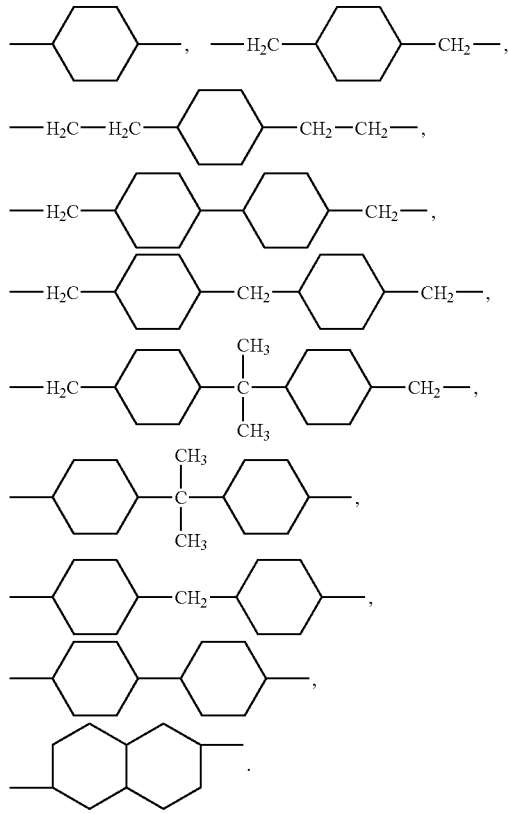

The preferred cycloaliphatic radical $R^{16}$ is derived from the 1,4-cyclohexyl diacids and most preferably greater than 70 mole % thereof in the form of the trans isomer. The preferred cycloaliphatic radical $R^{15}$ is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. They may also be prepared by the use of an inert liquid medium in which a phthalic acid is at least partially soluble under reaction conditions and with a catalyst of palladium or ruthenium on carbon or silica.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula (16):

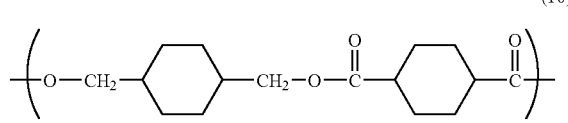

(16)

With reference to the previously set forth general formula, for PCCD, $R^{15}$ is derived from 1,4 cyclohexane dimethanol; and $R^{16}$ is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

The preferred aliphatic polyesters have a glass transition temperature (Tg) which is above 50° C., more preferably above 80° C. and most preferably above about 100° C.

Also contemplated herein are the above polyesters with about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The composition may further comprise a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (17) (sometimes referred to herein as 'siloxane'):

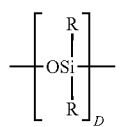

(17)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (17) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (18):

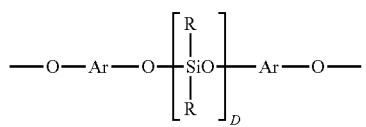

(18)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula (19):

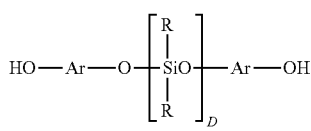

(19)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (20):

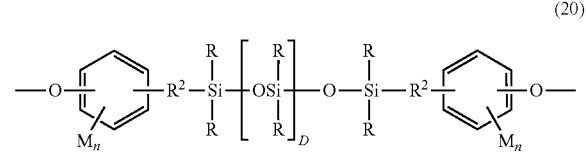

(20)

wherein R and D are as defined above. $R^2$ in formula (20) is a divalent $C_2$-$C_8$ aliphatic group. Each M in formula (20) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (21):

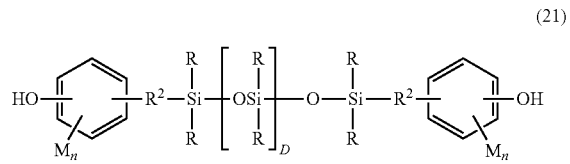

(21)

wherein R, D, M, $R^2$, and n are as described above.

Such dihydroxy polysiloxanes can be made by effecting a platinum catalyzed addition between a siloxane hydride of the formula (22),

(22)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (21) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

In various embodiments, the thermoplastic composition comprises about 30 wt. % to about 89.5 wt. % polycarbonate resin; optionally about 40 wt. % to about 89.5 wt. % polycarbonate; optionally about 50 wt. % to 85 wt. % polycarbonate. The thermoplastic composition comprises about 0.5 wt. % to about 20 wt. % impact modifier; optionally about 1 wt. % to about 20 wt. % impact modifier; optionally about 1 wt. % to about 12 wt. % impact modifier. The composition comprises about 6 wt. % to 35 wt. % mineral filler, optionally about 6 wt. % to about 25 wt. % mineral filler and in some embodiments, about 8 wt. % to about 25 wt. % mineral filler. The composition also comprises from about 4 to 20 wt. % of a titanium dioxide having a coating of silicone or siloxane, optionally about 6 to about 16 wt. %, and in some embodiments, from about 8 to about 16 wt. % of a titanium dioxide having a coating of silicone or siloxane. The composition optionally further comprises about 0.01 wt. % to about 5 wt. % acid, optionally about 0.05 wt. % to about 2 wt. %, and in some embodiments about 0.1 wt. % to about 1 wt. % acid. The thermoplastic composition comprises from about 0 wt. % to about 25 wt. % aromatic vinyl copolymer. The weight ratio of acid to filler in the composition, if present, should be at least 0.0035:1; optionally at least 0.005:1; optionally at least 0.0075:1; optionally at least 0.015:1; optionally, at least 0.03:1; optionally at least 0.06:1; optionally at least 0.12:1; depending on the desired balance of properties. The composition also optionally comprises from about 0.01 to 7 wt. % of additives. In an embodiment, the molecular weight of the polycarbonate is at least 46,000 g/mol, optionally at least 48,000 g/mol, optionally at least 50,000 g/mol, based on polystyrene calibration standards. All of the foregoing wt. % values are based on the combined weight of the total composition.

The compositions described herein may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the total composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the total composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the total composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy] methyl]propane (UVINUL™ 3030); 2,2'-(1,4-phenylene)bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the total composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the total composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide(polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the total composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the total composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on the weight of the total composition.

Suitable flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

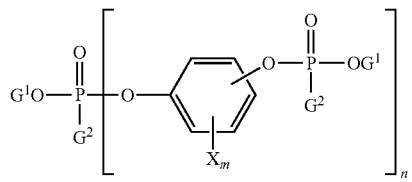

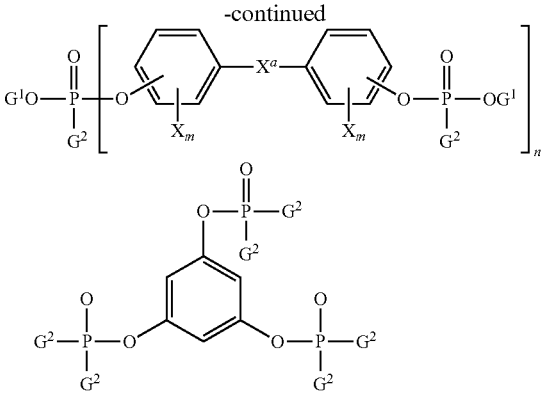

wherein each $G^1$ is independently a hydrocarbon having 1 to about 30 carbon atoms; each $G^2$ is independently a hydrocarbon or hydrocarbonoxy having 1 to about 30 carbon atoms; each $X^a$ is as defined above; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide.

Halogenated materials may also be used as flame retardants, for example halogenated compounds and resins of formula (23):

(23)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (23) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and optionally two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant.

Inorganic flame retardants may also be used, for example salts of $C_{2-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Another useful type of flame retardant is a polysiloxane-polycarbonate copolymer having polydiorganosiloxane blocks comprising repeating structural units of formula (20), as previously described.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in? an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4' oxybis(benzenesulfonylhydrazide), sodium bicarbonate, ammonium carbonate, or the like; or combinations comprising at least one of the foregoing blowing agents.

The thermoplastic compositions may be manufactured by methods generally available in the art, for example, in one embodiment, in one manner of proceeding, powdered polycarbonate resin, mineral filler, acid or acid salt, optional impact modifier, optional aromatic vinyl copolymer and any other optional components are first blended, optionally with other fillers in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The polycarbonate compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive parts, including panel and trim, spoilers, luggage doors, body panels, as well as walls and structural parts in recreation vehicles.

The compositions are further illustrated by the following non-limiting examples, which were prepared from the components set forth in Table 1.

TABLE 1

| Material | Description | Source |
|---|---|---|
| Polycarbonate (PC-1) | BPA polycarbonate resin made by the interfacial process with an MVR at 300° C./1.2 kg, of 5.1-6.9 g/10 min. (typical range 60,000-64,000 g/mol) | GE Plastics |
| Polycarbonate (PC-2) | BPA polycarbonate resin made by the interfacial process with an MVR at 300° C./1.2 kg, of 23.5-28.5 g/10 min. (typical range 40,000 to 44,000 g/mol) | GE Plastics |
| Polycarbonate Blend (PC Blend) | A blend of PC-1 and PC-2 in a ratio of 75% of PC-1 to 25% PC-2 (typical range 52,000-56,000 g/mol) | GE Plastics |
| MBS | MBS is nominal 75-82 wt. % butadiene core with a balance styrene-methyl methacrylate shell. Trade name EXL-2691A | Rohm & Haas |
| Filler | Talc (Trade name Jetfine 3CA) | Luzenac |
| $TiO_2$-1 | Titanium Dioxide coated with alumina and polysiloxane surface treatment (Kronos ® 2233 Titanium Dioxide). Bulk density of 700 g/m$^2$, oil absorption of 13 as measured using ISO 787/5 and a titanium dioxide content of greater than or equal to 96%. | Kronos Worldwide, Inc. |
| $TiO_2$-2 | Titanium Dioxide coated with alumina and organic treatment (Ti-Pure ® R103 Titanium Dioxide) | E.I. du Pont de Nemours and Co. |
| $TiO_2$-3 | Titanium Dioxide coated with an aluminum, silicon, polysiloxane and polyalcohol compound surface treatment (Kronos ® 2450 Titanium Dioxide). Bulk density of 900 g/m$^2$, oil absorption of 14 as measured using ISO 787/5 and titanium dioxide content of greater than or equal to 96%. | Kronos Worldwide, Inc. |
| $TiO_2$-4 | Titanium Dioxide coated with alumina and silica with organic surface treatment (Tiona ® RL-91) | Millennium Chemicals |
| Acid | Phosphorous Acid ($H_3PO_3$) 45% acid in water | Quaron |
| SAN | High flow bulk styrene acrylonitrile copolymer comprising 15-35 wt. % acrylonitrile with an Melt Flow of 5.2-7.2 g/10 min at 190° C./2.16 kg | GE Plastics |
| PMHS | Poly methyl hydrogen siloxane (Tradename DF1040) | GE Bayer Silicones |

Sample compositions were prepared to screen the different titanium dioxides using the materials in Table 1 according to amounts in Table 2. All amounts are in weight percent. All sample have the same amounts of components (totally 100 parts by weight), and different types and amounts of titanium dioxide were then added to the compositions. The first sample is a Control sample. In each of the examples, samples were prepared by melt extrusion on a Werner & Pfleiderer™ 25 mm twin screw extruder at a nominal melt temperature of about 280° C., about 0.7 bars of vacuum, and about 450 rpm. The extrudate was pelletized and dried at about 100° C. for about 2 hours. To make test specimens, the dried pellets were injection molded on an 110-ton injection molding machine at a nominal melt temperature of 300° C., with the melt temperature approximately 5 to 10° C. higher.

TABLE 2

| | Units | Cont | Ex. A-1 | Ex. A-2 | Ex. A-3 | Ex. A-4 | Ex. A-5 | Ex. A-6 | Ex. A-7 | Ex. A-8 |
|---|---|---|---|---|---|---|---|---|---|---|
| COMPONENT | | | | | | | | | | |
| PC Blend | % | 77.13 | 77.13 | 77.13 | 77.13 | 77.13 | 77.13 | 77.13 | 77.13 | 77.13 |
| SAN | % | 9.5 | 9.5 | 9.5 | 9.5 | 9.5 | 9.5 | 9.5 | 9.5 | 9.5 |
| MBS | % | 4.4 | 4.4 | 4.4 | 4.4 | 4.4 | 4.4 | 4.4 | 4.4 | 4.4 |
| Filler | % | 8 | 8 | 8 | 8 | 8 | 8 | 8 | 8 | 8 |
| Acid | % | 0.12 | 0.12 | 0.12 | 0.12 | 0.12 | 0.12 | 0.12 | 0.12 | 0.12 |
| $TiO_2$-1 | % | 0 | 1.0 | 2.5 | 0 | 0 | 0 | 0 | 0 | 0 |
| $TiO_2$-2 | % | 0 | 0 | 0 | 1.0 | 2.5 | 0 | 0 | 0 | 0 |
| $TiO_2$-3 | % | 0 | 0 | 0 | 0 | 0 | 1.0 | 2.5 | 0 | 0 |
| $TiO_2$-4 | % | 0 | 0 | 0 | 0 | 0 | 0 | 0 | 1.0 | 2.5 |
| Additives* | % | 0.85 | 0.85 | 0.85 | 0.85 | 0.85 | 0.85 | 0.85 | 0.85 | 0.85 |
| PHYSICAL PROPERTY | | | | | | | | | | |
| Notched Izod Impact, 23° C. | kJ/m$^2$ | 40.0 | 40.4 | 42.6 | 34.4 | 16.0 | 34.9 | 29.1 | 36.1 | 35.5 |
| Tensile Modulus | MPa | 3100 | 3142 | 3175 | 3137 | 3175 | 3138 | 3176 | 3156 | 3199 |
| MW Retention | % | 100 | 99 | 97 | 99 | 98 | 98 | 96 | 95 | 99 |

*Additives included a stabilization package comprising 0.25 wt. % antioxidant, 0.1 wt. % Tris(di-t-butylphenyl)phosphite, 0.25 wt. % Pentaerythritol tetrakis(3-laurylthiopropionate), and 0.25 wt. % mold release agent (based on 100 parts by weight of the composition including the stabilization package) was also added to the compositions.

As seen from Table 2, the properties of the samples with the 4 different types TiO$_2$ differ from the Control sample (Cont). Examples A-3 and A-4 have a significant decrease in the impact performance, Examples A-1, A-2, A-5, A-6, A-7 and A-8, which contain a coated TiO$_2$, unexpectedly show either no significant increase or decrease in properties, or a slight improvement in impact performance. A decrease in impact performance is expected since TiO$_2$ usually does not improve the mechanical properties. It is particularly surprising that coated TiO$_2$ either maintains or improves the properties, depending on the specific TiO$_2$ used.

Additional samples were produced using the materials in Table 1 and the procedure previously described. The TiO$_2$-1 was added in increasing amounts. The formulations and results are shown in Table 3 below. All amounts in Table 3 are weight percent unless otherwise specified.

TABLE 3

| | Units | Ex. B-1 | Ex. B-2 | Ex. B-3 | Ex. B-4 | Ex. B-5 |
|---|---|---|---|---|---|---|
| COMPONENT | | | | | | |
| PC-1 | % | 53.36 | 51.76 | 48.56 | 45.76 | 39.76 |
| PC-2 | % | 13.35 | 12.95 | 12.15 | 15.25 | 13.25 |
| SAN | % | 9.5 | 9.5 | 9.5 | 9.5 | 9.5 |
| MBS | % | 4.4 | 4.4 | 4.4 | 4.4 | 4.4 |
| Filler | % | 18 | 18 | 18 | 16 | 16 |
| Acid | % | 0.54 | 0.54 | 0.54 | 0.24 | 0.24 |
| TiO$_2$-1 | % | 0 | 2.0 | 6.0 | 8.0 | 16.0 |
| Additives* | % | 0.85 | 0.85 | 0.85 | 0.85 | 0.85 |
| PHYSICAL PROPERTY | | | | | | |
| Notched Izod Impact, 23° C. | kJ/m$^2$ | 9.9 | 10.0 | 13.8 | 15.7 | 18.3 |
| Flex plate impact Ductility at 23° C. | % | 100 | 100 | 100 | 100 | 100 |
| Flex plate impact Ductility at 0° C. | % | 100 | 0 | 0 | 100 | 0 |
| Tensile Modulus | MPa | 4346 | 4547 | 4772 | 4544 | 5031 |
| Vicat B/50 | ° C. | 139.1 | 139.3 | 139.1 | 139.4 | 138.6 |
| MVR 260° C. 5 kg | cm$^3$/10 min | 5.2 | 4.6 | 5.5 | 6.0 | 5.8 |
| PC MW Retention | % | 97 | 99 | 98 | 98 | 98 |

*Additives included a stabilization package comprising 0.25 wt. % antioxidant, 0.1 wt. % Tris(di-t-butylphenyl)phosphite, 0.25 wt. % Pentaerythritol tetrakis(3-laurylthiopropionate), and 0.25 wt. % mold release agent (based on 100 parts by weight of the composition including the stabilization package) was also added to the compositions.

Examples B-1, B-2 and B-3 show the effect of TiO$_2$ addition. Both the notched Izod impact and the tensile modulus increase dramatically with the addition of the TiO$_2$ while Vicat and MVR show no significant change. The ductility at 0° C. could not be maintained at the 18% talc level, but at 16% talc and 8% TiO$_2$ (Example B-4, which is also 2% more TiO$_2$ than Example B-3) the ductility at 0° C. was achieved, along with higher notched Izod impact and higher flow (MVR). Comparing Examples B-4 and B-2 shows that all physical properties improved with the higher level of TiO$_2$ and slightly lower talc loading. Additionally, comparing Examples B-4 and B-1 shows that while Example B-4 has less talc filler and more coated TiO$_2$, there is a small increase in stiffness but a significant increase in notched Izod impact as well as an increase in flow (MVR). This is unexpected as the total filler level (talc plus TiO$_2$) for Example B-4 is 24% compared to 18% for Example B-1. An excellent balance of properties was obtained at the higher levels, such as with Example B-5, which has very high tensile modulus (stiffness) combined with high notched Izod impact and good flow.

Additional samples were produced using the materials in Table 1 and the procedure detailed above. The additional samples studied the addition of two different coated TiO$_2$ samples (TiO$_2$-1 and TiO$_2$-3) at various levels, along with different levels of talc. In some examples, PMHS was also added to the composition to study the effect. The composition of the samples are shown in Table 4, and the test results in Table 5 below.

TABLE 4

| COMPONENTS | Units | 1 | 2 | 3 | 4 | 5 | 6 | 7 | 8 | 9 | 10 | 11 |
|---|---|---|---|---|---|---|---|---|---|---|---|---|
| PC-1 | % | 85.25 | 77.01 | 68.77 | 60.53 | 81.25 | 73.01 | 64.77 | 56.53 | 77.25 | 69.01 | 69.25 |
| SAN | % | 9.5 | 9.5 | 9.5 | 9.5 | 9.5 | 9.5 | 9.5 | 9.5 | 9.5 | 9.5 | 9.5 |
| MBS | % | 4.4 | 4.4 | 4.4 | 4.4 | 4.4 | 4.4 | 4.4 | 4.4 | 4.4 | 4.4 | 4.4 |
| Filler | % | 0 | 8 | 16 | 24 | 0 | 8 | 16 | 24 | 0 | 8 | 0 |
| TiO$_2$-1 | % | 0 | 0 | 0 | 0 | 4 | 4 | 4 | 4 | 8 | 8 | 16 |
| TiO$_2$-3 | % | 0 | 0 | 0 | 0 | 0 | 0 | 0 | 0 | 0 | 0 | 0 |
| PMHS | % | 0 | 0 | 0 | 0 | 0 | 0 | 0 | 0 | 0 | 0 | 0 |
| Acid | % | 0 | 0.24 | 0.48 | 0.72 | 0 | 0.24 | 0.48 | 0.72 | 0 | 0.24 | 0 |
| Others* | % | 0.85 | 0.85 | 0.85 | 0.85 | 0.85 | 0.85 | 0.85 | 0.85 | 0.85 | 0.85 | 0.85 |

| COMPONENTS | Units | 12 | 13 | 14 | 15 | 16 | 17 | 18 | 19 | 20 | 21 |
|---|---|---|---|---|---|---|---|---|---|---|---|
| PC-1 | % | 61.01 | 77.15 | 72.91 | 68.91 | 77.25 | 73.25 | 69.25 | 61.25 | 73.01 | 69.01 |
| SAN | % | 9.5 | 9.5 | 9.5 | 9.5 | 9.5 | 9.5 | 9.5 | 9.5 | 9.5 | 9.5 |
| MBS | % | 4.4 | 4.4 | 4.4 | 4.4 | 4.4 | 4.4 | 4.4 | 4.4 | 4.4 | 4.4 |
| Filler | % | 8 | 0 | 8 | 8 | 8 | 8 | 8 | 8 | 8 | 8 |
| TiO$_2$-1 | % | 16 | 0 | 0 | 0 | 0 | 4 | 8 | 16 | 0 | 0 |
| TiO$_2$-3 | % | 0 | 8 | 4 | 8 | 0 | 0 | 0 | 0 | 4 | 8 |
| PMHS | % | 0 | 0.1 | 0.1 | 0.1 | 0 | 0 | 0 | 0 | 0 | 0 |
| Acid | % | 0.24 | 0 | 0.24 | 0.24 | 0 | 0 | 0 | 0 | 0.24 | 0.24 |
| Others* | % | 0.85 | 0.85 | 0.85 | 0.85 | 0.85 | 0.85 | 0.85 | 0.85 | 0.85 | 0.85 |

*A stabilization package comprising 0.25 wt. % antioxidant, 0.1 wt. % Tris(di-t-butylphenyl)phosphite, 0.25 wt. % Pentaerythritol tetrakis(3-laurylthiopropionate), and 0.25 wt. % mold release agent (based on 100 parts by weight of the composition including the stabilization package) was also added to all compositions.

TABLE 5

| PHYSICAL PROPERTIES | Units | 1 | 2 | 3 | 4 | 5 | 6 | 7 | 8 | 9 | 10 | 11 |
|---|---|---|---|---|---|---|---|---|---|---|---|---|
| PC Mw Retention After Molding | % | 97 | 97 | 97 | 95 | 95 | 97 | 97 | 96 | 94 | 96 | 93 |
| Notched Izod Impact, 23° C. | kJ/m² | 67.5 | 56.0 | 24.7 | 6.3 | 66.3 | 52.0 | 23.4 | 5.3 | 60.9 | 49.9 | 54.7 |
| Notched Izod Impact, 0° C. | kJ/m² | 61.1 | 41.0 | 11.4 | 6.4 | 60.9 | 41.8 | 11.3 | 4.9 | 55.9 | 39.2 | 49.9 |
| Notched Izod Impact, −30° C. | kJ/m² | 23.8 | 13.3 | 9.3 | 6.0 | 24.9 | 13.9 | 9.5 | 5.7 | 34.8 | 14.4 | 35.0 |
| Flex Plate Impact, 23° C. | | | | | | | | | | | | |
| Ductility Flex Plate Impact, 0° C. | % | 100 | 100 | 100 | 100 | 100 | 100 | 100 | 0 | 100 | 100 | 100 |
| Ductility Tensile 5 mm/min | % | 100 | 100 | 100 | 0 | 100 | 100 | 100 | 0 | 100 | 100 | 100 |
| Modulus (5 mm/min) | MPa | 2263 | 3047 | 4005 | 5228 | 2361 | 3192 | 4177 | 5543 | 2443 | 3376 | 2597 |
| Elongation | % | 105 | 114 | 71 | 5 | 115 | 115 | 27 | 4 | 115 | 111 | 110 |
| Vicat B/50 | ° C. | 139.3 | 140.2 | 139.7 | 139.9 | 139.0 | 139.3 | 139.2 | 139.3 | 137.9 | 138.9 | 136.5 |
| MVR 300° C. 5 kg | cm³/10 min | 36.0 | 29.5 | 19.8 | 14.5 | 38.1 | 25.1 | 21.0 | 15.4 | 41.4 | 29.0 | 35.3 |

| PHYSICAL PROPERTIES | Units | 12 | 13 | 14 | 15 | 16 | 17 | 18 | 19 | 20 | 21 |
|---|---|---|---|---|---|---|---|---|---|---|---|
| PC Mw Retention After Molding | % | 95 | 93 | 95 | 93 | 68 | 77 | 87 | 91 | 93 | 84 |
| Notched Izod Impact, 23° C. | kJ/m² | 47.0 | 59.4 | 47.3 | 38.7 | 7.2 | 11.5 | 42.2 | 39.6 | 37.0 | 10.9 |
| Notched Izod Impact, 0° C. | kJ/m² | 36.7 | 53.7 | 33.6 | 25.8 | 7.3 | 10.5 | 21.8 | 31.6 | 14.7 | 9.9 |
| Notched Izod Impact, −30° C. | kJ/m² | 13.4 | 25.7 | 12.9 | 11.8 | 7.0 | 9.5 | 12.0 | 12.9 | 11.5 | 8.7 |
| Flex Plate Impact, 23° C. | | | | | | | | | | | |
| Ductility Flex Plate Impact, 0° C. | % | 100 | 100 | 100 | 100 | 100 | 100 | 100 | 100 | 100 | 100 |
| Ductility Tensile 5 mm/min | % | 100 | 100 | 100 | 100 | 0 | 100 | 100 | 100 | 100 | 100 |
| Modulus (5 mm/min) | MPa | 3646 | 2472 | 3215 | 3372 | 3093 | 3204 | 3357 | 3647 | 3215 | 3365 |
| Elongation | % | 104 | 106 | 114 | 98 | 62 | 81 | 76 | 89 | 106 | 80 |
| Vicat B/50 | ° C. | 137.3 | 137.7 | 139.0 | 138.3 | 136.3 | 137.0 | 137.9 | 137.0 | 138.9 | 136.4 |
| MVR 300° C. 5 kg | cm³/10 min | 27.3 | 43.4 | 25.2 | 27.0 | 69.5 | 50.9 | 33.2 | 30.0 | 29.0 | 36.1 |

The compositions in Tables 2, 3 and 4 were tested for PC Molecular Weight Retention, Melt Volume Rate, Izod Notched Impact Strength, Flex Plate Impact (FPI) Ductility, Tensile Modulus and Elongation, and Vicat B/50. The details of these tests used in the examples are known to those of ordinary skill in the art, and may be summarized as follows:

Molecular Weight is measured by gel permeation chromatography (GPC) in methylene chloride solvent. Polystyrene calibration standards are used to determine and report relative molecular weights (values reported are polycarbonate molecular weight relative to polystyrene, not absolute polycarbonate molecular weight numbers). Changes in weight average molecular weight are typically used. This provides a means of measuring changes in chain length of a polymeric material, which can be used to determine the extent of degradation of the thermoplastic as a result of exposure processing. Degraded materials would generally show reduced molecular weight, and could exhibit reduced physical properties. Typically, molecular weights are determined before and after processing, and the molecular weight retention is the molecular weight after processing as a percentage of the molecular weight before processing.

Melt Volume Rate (MVR) was determined at 260° C. or 300° C., as indicated, using a 5-kilogram weight, over 10 minutes, in accordance with ISO 1133.

Izod Impact Strength ISO 180 ('NII') is used to compare the impact resistances of plastic materials. Izod Impact was determined using a 4 mm thick, molded Izod notched impact (INI) bar. It was determined per ISO 180/1A. The ISO designation reflects type of specimen and type of notch: ISO 180/1A means specimen type 1 and notch type A. ISO 180/1U means the same type 1 specimen, but clamped in a reversed way, (indicating unnotched). The ISO results are defined as the impact energy in joules used to break the test specimen, divided by the specimen area at the notch. Results are reported in kJ/m².

Vicat Softening Temperature (ISO 306) is a measure of the temperature at which a plastic starts to soften rapidly. A round, flat-ended needle of 1 mm² cross section penetrates the surface of a plastic test specimen under a predefined load, and the temperature is raised at a uniform rate. The Vicat softening temperature, or VST, is the temperature at which the penetration reaches 1 mm. ISO 306 describes two methods: Method A—load of 10 Newtons (N), and Method B—load of 50 N, with two possible rates of temperature rise: 50° C./hour (° C./h) or 120° C./h. This results in ISO values quoted as A/50, A/120, B/50 or B/120. The test assembly is immersed in a heating bath with a starting temperature of 23° C. After 5 minutes (min) the load is applied: 10 N or 50 N. The temperature of the bath at which the indenting tip has penetrated by 1±0.01 mm is reported as the VST of the material at the chosen load and temperature rise.

Tensile properties such as Tensile Strength and Tensile Elongation to break were determined using 4 mm thick molded tensile bars tested per ISO 527 at 5 mm/min. It is also possible to measure at 50 mm/min. if desired for the specific application, but the samples measured in the experiments were measured at 5 mm/min. Tensile modulus is always measured at the start of the test with an initial rate of 1 mm/min, after which the test is continued at either 5 mm/min. or 50 mm/min. to measure the other tensile properties.

Flex Plate Impact (FPI) is determined per ISO 6603 and in the described experiments with an impact speed of 2.25 m/s. FPI % Ductility (at a certain temperature, such as 0 or 23° C.) is reported as the percentage of five samples which, upon failure in the impact test, exhibited a ductile failure rather than rigid failure, the latter being characterized by cracking and the formation of shards.

Table 5 illustrates that the addition of coated TiO₂ addition to the blend decreased notched Izod impact at 23° C. and 0° C. while improving it at −30° C. Example 1 is a control sample with no TiO₂, and Examples 5, 9 and 11 have increasing amounts of coated TiO₂ with no filler. The blend stability (PC MW retention) is not significantly improved by the addition of coated TiO₂. Comparing Examples 9 and 13 show that the addition of uncoated TiO₂ along with PMHS does not show the −30° C. notched Izod impact improvement that is shown in Example 9, and Example 13 also has decreased stability compared to Example 9. The addition of 4% coated TiO₂ to unfilled blends decreases blend stability (compare Example 5 to Example 1), but surprisingly, the addition of the same amount of 4% coated TiO₂ to talc filled blends (compare Example 6 to Example 2, Example 7 to Example 3 and Example 8 to Example 4) maintains or improves the blend stability. When PMHS was added along with TiO₂ (compare Example 14 to Examples 6 and 2), the blend properties are not as good as comparable blends having the coated TiO₂ without the additional PMHS. Physical properties are dramatically improved in talc filled blends with the coated TiO₂ but without the acid addition. Comparing Examples 16 to 19 illustrate that the addition of coated TiO₂ to filled polycarbonate blends significantly improves notched Izod impact at 23° C. and PC MW Retention. This same effect is not shown for unfilled blends, and the effect is only marginal for talc filled blends also having a small amount of acid. This clearly demonstrates the synergy between talc and coated TiO₂.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A thermoplastic resin composition comprising:
   from 50 to 89.5 wt. % of an aromatic polycarbonate wherein the molecular weight of the polycarbonate is at least 50,000 g/mol based on polystyrene calibration standards;
   from 0.5 to 20 wt. % of an impact modifier;
   from 0 to 25 wt. % of an aromatic vinyl copolymer;
   from 8 to 25 wt. % of talc; and
   from 4 to 16 wt. % of a titanium dioxide coated with a surface treatment consisting of alumina and a polysiloxane, wherein the coated titanium dioxide has a bulk density of 700 g/m², an oil absorption of 13 as measured using ISO 787/5 and a titanium dioxide content of greater than or equal to 96%, and
   wherein the composition has an increased Notched Izod impact strength at 23° C. as compared to a thermoplastic resin composition having the same composition but with a titanium dioxide coated with a surface treatment consisting of aluminum, silicon, polysiloxane and polyalcohol compounds and having a bulk density of 900 g/m², an oil absorption of 14 as measured using ISO 787/5 and a titanium dioxide content of greater than or equal to 96%;
   wherein the wt % is based on the total weight of the composition.

2. The thermoplastic composition of claim 1, further comprising an acid or acid salt.

3. The thermoplastic composition of claim 2, wherein the acid or acid salt comprises phosphorus.

4. The thermoplastic composition of claim 2, wherein the acid or acid salt is present in a weight ratio of acid to filler of at least 0.0035:1.

5. The thermoplastic composition of claim 1, wherein the impact modifier comprises ABS, MBS, Bulk ABS, AES, ASA, MABS, polycarbonate-polysiloxane copolymers, or combinations thereof.

6. The thermoplastic composition of claim 1, wherein the aromatic vinyl copolymer comprises SAN.

7. The thermoplastic composition of claim 1, wherein the talc has a particle size distribution D50 of 3 microns or less.

8. The thermoplastic composition of claim 1, wherein the composition comprises from 6 to 16 wt. % titanium dioxide.

9. The thermoplastic composition of claim 1, wherein the composition comprises from 8 to 18 wt % talc.

10. An article comprising the thermoplastic composition of claim 1.

11. A thermoplastic resin composition comprising:
    from 50 to 85 wt. % of an aromatic polycarbonate wherein the molecular weight of the polycarbonate is at least 50,000 g/mol based on polystyrene calibration standards;
    from 1 to 20 wt. % of an impact modifier;
    from 0 to 25 wt. % of an aromatic vinyl copolymer;
    from 8 to 25 wt. % of talc; and
    from 4 to 16 wt. % of a titanium dioxide coated with a surface treatment consisting of alumina and a polysiloxane, wherein the coated titanium dioxide has a bulk density of 700 g/m², an oil absorption of 13 as measured using ISO 787/5 and a titanium dioxide content of greater than or equal to 96%, and wherein the composition has an increased Notched Izod impact strength 23° C. as compared to a thermoplastic resin composition having the same composition but with a titanium dioxide coated with a surface treatment consisting of aluminum, silicon, polysiloxane and polyalcohol compounds and having a bulk density of 900 g/m², an oil absorption of 14 as measured using ISO 787/5 and a titanium dioxide content of greater than or equal to 96%;

wherein the wt % is based on the total weight of the composition.

12. The thermoplastic resin composition of claim 11, wherein the composition comprises from 1 to 12 wt. % of the impact modifier, from 6 to 16 wt. % of the titanium dioxide, and optionally from 2 to 15 wt. % of the aromatic vinyl copolymer.

13. The thermoplastic composition of claim 11, further comprising an acid or acid salt.

14. An article comprising the thermoplastic composition of claim 11.

15. A thermoplastic composition consisting of:
from 60 to 85 wt. % of an aromatic polycarbonate wherein the molecular weight of the polycarbonate is at least 50,000 g/mol based on polystyrene calibration standards;
from 1 to 20 wt. % of an impact modifier;
from 2 to 25 wt. % of an aromatic vinyl copolymer;
from 8 to 25 wt. % of talc;
from 0.01 to 5 wt. % of an acid or acid salt;
4 to 16 wt. % of a titanium dioxide coated with a surface treatment consisting of alumina and a polysiloxane, wherein the coated titanium dioxide has a bulk density of 700 g/m², an oil absorption of 13 as measured using ISO 787/5 and a titanium dioxide content of greater than or equal to 96%; and
from 0.01 to 7 wt. % of additives, wherein the additives comprise a filler, an antidrip agent, a heat stabilizer, a light stabilizer, an antioxidant, a plasticizer, an antistat agent, a mold release agent, a UV absorber, a lubricant, a pigment, a dye, a colorant, or combinations of two or more of the foregoing,
wherein the composition has an increased Notched Izod impact strength 23° C. as compared to a thermoplastic resin composition having the same composition but with a titanium dioxide coated with a surface treatment consisting of aluminum, silicon, polysiloxane and polyalcohol compounds and having a bulk density of 900 g/m², an oil absorption of 14 as measured using ISO 787/5 and a titanium dioxide content of greater than or equal to 96%;
wherein the wt % is based on the total weight of the composition.

16. The thermoplastic composition of claim 15, wherein the composition comprises from 6 to 16 wt. % titanium dioxide.

17. An article comprising the thermoplastic composition of claim 15.

* * * * *